United States Patent
Miyamoto et al.

[11] Patent Number: 5,595,835
[45] Date of Patent: Jan. 21, 1997

[54] SEALED TYPE BATTERY

[75] Inventors: Kenichi Miyamoto; Hisashi Tukamoto; Tetuzo Kojima; Takao Maki; Masanori Kogure, all of Kyoto, Japan

[73] Assignee: Japan Storage Battery Co., Ltd., Kyoto, Japan

[21] Appl. No.: 406,847

[22] PCT Filed: Jul. 22, 1994

[86] PCT No.: PCT/JP94/01210

§ 371 Date: May 22, 1995

§ 102(e) Date: May 22, 1995

[30] Foreign Application Priority Data

Jul. 22, 1993 [JP] Japan .................................. 5-202734
Jun. 30, 1994 [JP] Japan .................................. 6-171802

[51] Int. Cl.$^6$ .................................................. H01M 2/00
[52] U.S. Cl. .................................................. 429/56; 429/94
[58] Field of Search .................................. 429/56, 94

[56] References Cited

U.S. PATENT DOCUMENTS

| 418,483 | 12/1889 | Woolf | 429/94 |
|---|---|---|---|
| 3,530,001 | 9/1970 | Harivel | 429/94 |
| 4,345,611 | 8/1982 | Ikeda et al. | 429/56 X |
| 4,783,383 | 11/1988 | Machida et al. | 429/56 |
| 5,415,954 | 5/1995 | Gauthier et al. | 429/94 |

FOREIGN PATENT DOCUMENTS

| 64-23873 | 2/1989 | Japan . |
|---|---|---|
| 1-255172 | 10/1989 | Japan . |
| 2-284350 | 11/1990 | Japan . |
| 3-225746 | 10/1991 | Japan . |

*Primary Examiner*—Stephen Kalafut
*Attorney, Agent, or Firm*—Sughrue, Mion, Zinn, Macpeak & Seas

[57] ABSTRACT

A sealed type battery is disclosed which can reduce variations in the operating pressure of a safety valve, improve the reliability for the airtightness of a battery vessel, remove the contact of electrode plates and the case due to the rightward or leftward deviation of a group of electrode plates in the direction of the winding shaft, remarkably reduce the internal short-circuiting production rate, and realize cost lowering or reduction in the number of working steps. The battery is equipped with a safety valve in which a cover plate having a hole, a metal thin plate and a holding plate of metal having a hole are stacked with the metal thin plate sandwiched and integrally fixed by laser welding. Further, the center line of the winding axis of a group of spiral electrodes is in parallel to the opening face of a battery case and the width of a separator in the direction of the winding axis is larger than the side of the opening portion of a angular tubular case in parallel to the direction of the winding axis.

19 Claims, 5 Drawing Sheets

FIG. 9B
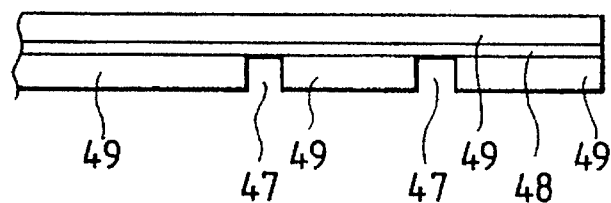
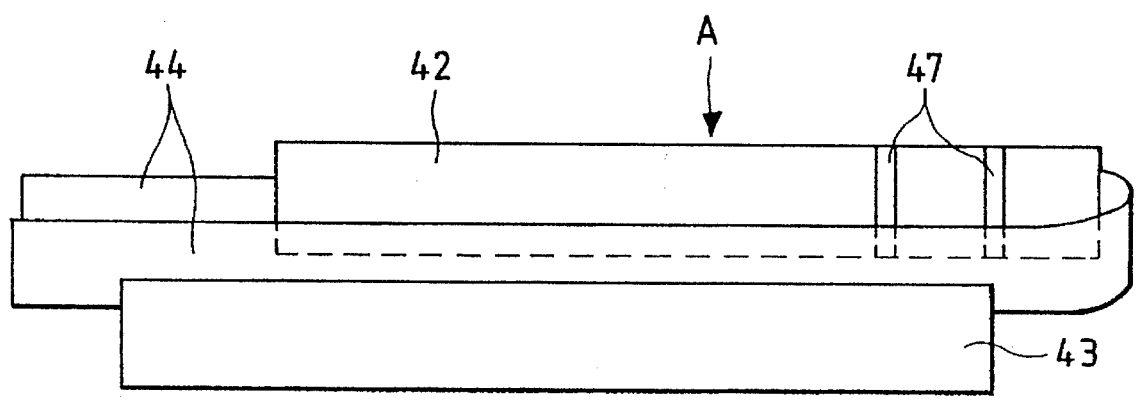
FIG. 9A
FIG. 10
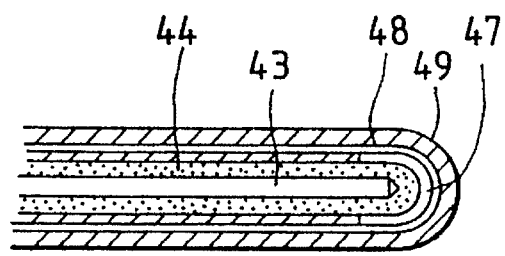

SEALED TYPE BATTERY

TECHNICAL FIELD

The present invention relates to a sealed type battery, and more particularly to an improvement of safety in a sealed type battery.

BACKGROUND ART

A battery having a completely sealed structure, which provides enhanced sealing and excellent storage. But, where it is heated to high temperatures, used in an abnormal manner such as charging at a high voltage and large current, or short-circuited internally so that the internal temperature becomes abnormally high, the internal pressure of the battery increases. As a result, the battery can explode and hence the contents of the battery will scatter. This may cause damage to people and instruments in the vicinity of the battery.

For this reason, in order to prevent the pressure within the battery from exceeding the pressure at which the battery explodes, a proposal for a sealed type battery was made in which a cut or check is previously made and the pressure is released through its tearing (e.g. Examined Japanese Utility Model Publication No. Sho 58-17332 (1983), Unexamined Japanese Utility Model Publication No. Sho 60-65970 (1985)).

In the conventional sealed type battery in which a cut is made at a portion of the battery can, it is difficult to control precisely a variation in the remaining thickness of the cut in a machining such as stamping or wet etching. Thus, although the above conventional sealed type battery can improve the safety for explosion, when external shock is applied to the battery can, the sealing state of the battery can is likely to be broken. For this reason, a safety valve device was demanded which can operate stably and precisely at a desired pressure within a pressure range where safety is assured.

Accordingly, for the sealed type battery, in order to provide a safety valve device which operates stably and precisely at a desired pressure in accordance with an increase in the internal pressure, there was proposed. An explosion proof safety valve for the sealed type battery in which a check is formed at a portion of a battery can characterized in that at least a portion of the battery can has a multi-layer structure composed of two or more metal plates bonded together and at least one of the metal plates is made of a metal plate having a single or plural holes or through-groves (Unexamined Japanese Patent Publication No. Hei 5-314959 (1993)).

The above proposal intends to control the remaining thickness of the cut by the thickness of the metal plates bonded together so that the processing accuracy of the remaining thickness of the cut is enhanced and a variation in the operating pressure of the explosion-proof mechanism for a battery can is removed.

As described above, it was very efficient to provide a safety valve device for the battery cell so as to improve the safety performance of the sealed type battery. But, it is also very important to apply the technique of effectively preventing the internal short-circuiting of the battery, which may be a cause of battery explosion, to the internal structure of the battery.

Specifically, as one of the conventional sealed type batteries, there was proposed a sealed type battery having a specific structure in which a group of spiral electrodes composed of band-like positive electrodes and negative electrodes wound in an elliptical spiral shape through a separator are inserted into the battery can from the square or elliptical opening face of a tubular case in its section in such a manner that the winding axis of the group of spiral electrodes is in parallel to the opening face of the battery can and thereafter the opening face is hermetically sealed. Such a battery has a problem of mechanical short-circuiting caused when the positive electrodes and negative electrodes winding-slip are brought into direct contact with each other because of vibration shock or the like, or indirectly short-circuited with each other through the battery can.

Further, the above sealed type battery having the group of spiral electrodes described above in which the positive electrode is made of lithium composite oxide and the negative electrode is made of lithium intercalation compound has a problem of chemical short-circuiting wherein lithium ions deintercalated from the positive electrode on the inside of the winding-back portion of the group of spiral electrodes are deposited in dendrite on the negative electrode and penetrate through the separator thereby to produce short-circuiting. This is due to the fact that on the inside of the winding-back portion in the neighborhood of the winding core of the elliptical electrodes with a small curvature of the winding-back portion, the area of the negative electrode plate opposite to the positive electrode plate is relatively small and the amount of lithium absorbed in the negative electrode is less than that of the amount of lithium discharged from the positive electrode.

The safety valve device proposed in Unexamined Japanese Patent Publication No. Hei 5-314959 has a multi-layer structure composed of two or more metal plates pasted together, and thermal crimping is recommended as bonding means.

However, bonding the metal plates together makes it difficult to assure sufficient fixing strength. Such a means is insufficient in view of the reliability for airtightness.

Further, bonding by thermal crimping, which gives thermal influence on the environment, is not preferable. For example, thermal crimping may cause components made of resin attached to a cover plate on the inside of the battery to chemically transform.

In a safety valve mechanism for the battery having a multi-layer structure composed of stacked metal plates having a hole or through-groove and no such a hole or through-groove, the problem to be solved is to fix the metal plates to be stacked without bonding them together to assure sufficient fixing strength, thereby enhancing the reliability for air-tightness.

As a technique for preventing mechanical short-circuiting of a battery, a method has been proposed in which an insulating plate is inserted in a plane perpendicular to the winding direction of a group of electrode plates inside a case. This method gives rise to another problem that the number of components and/or working steps increases thereby increasing production cost.

In order to prevent chemical short-circuiting, a winding core is inserted in a group of spiral electrodes to increase the curvature of a winding-back portion so that the area of a negative electrode opposite to a positive electrode is maintained at a predetermined value or more thereby preventing the amount of lithium absorbed in the negative electrode from becoming smaller than that of a lithium discharged from the positive electrode. This method, however, has defects that inclusion of the winding core within the battery reduces the battery capacity and increases the weight of the battery.

DISCLOSURE OF THE INVENTION

A sealed type battery of the present invention including a safety valve device in which a laminate of metal plates is integrally fixed by laser welding, said metal plates being comprised of a cover plate having a hole, a metal thin plate and a holding plate having a hole, characterized in that the metal thin plate is arranged between the cover plate and the holding plate so as to interrupt a gas discharging hole formed by the holes of the holding plate and cover plate. The sealed type battery of the present invention in which a group of spiral electrodes comprised of band-like positive electrodes and negative electrodes wound in an elliptical spiral shape through a separator are inserted from the square or elliptical opening face of a tubular case in its section in such a manner that the winding axis of the group of spiral electrodes is in parallel to the opening face of the case. Thereafter the opening face is hermetically sealed. The width of the separator in the direction of winding axis is larger than the internal size of the tubular case in parallel to the winding axis.

The sealed type battery of the present invention in which a group of spiral electrodes comprised of band-like positive electrodes and negative electrodes wound in an elliptical spiral shape through a separator are inserted from the square or elliptical opening face of a tubular case in its section, and the positive electrodes are made of lithium composite oxide and the negative electrodes are made of lithium intercalation compound, in the inside of the winding-back portion of the group of spiral electrodes, or in the inside of the winding-back portion to the maximum fifth from the winding core, the capacity of active material per a unit area of the positive electrode area is less than that of the positive electrode of the linear portion of the spiral electrode.

The safety valve device for the sealed type battery according to the present invention, in which the stack of metal plates is integrally fixed by laser welding, can assure sufficient fixing strength as compared with the case where it is fixed by bonding, thus improving reliability for airtightness. Since the holding plate is used, distortion or crack of a metal thin plate can be prevented which is likely to be produced when the metal thin plate is directly laser-welded onto the cover plate.

In the case of the sealed type battery using the conventional group of elliptical spiral electrodes, the width of the separator in the group of electrode plates in the direction of the winding shaft was larger than that of the electrodes of the group of electrode plates and smaller than the side of a tubular case which is parallel to the winding direction. On the other hand, in the sealed type battery according to the present invention, the width of the separator for the group of the electrode plates is larger than the side of the opening of an angular tubular can which is parallel to the winding axis. Accordingly, the portion extending off the case of the separator is automatically bent so as to cover the end surface of the electrode plate at the opening of the case and is inserted between the group of spiral electrodes and battery can so that the positive electrode plate serving as a spacer preventing the winding distortion of the electrodes and negative electrode case are insulated, thus preventing mechanical short-circuiting.

Further, in the sealed type according to the present invention, in which it is not necessary to use the components for insulation, production cost is not increased.

Further, in the sealed type battery according to the present invention, the amount of active material of the positive electrode area inside the winding-back portion of the group of spiral electrodes is made less than that of the positive electrode at the linear portion in order to overcome reduction in the amount of lithium absorbed in the negative electrode at the winding-back portion. This prevents deposition of lithium onto the negative electrode plate to prevent chemical short-circuiting of the battery.

BRIEF DESCRIPTION OF THE DRAWINGS

FIGS. 9A and 9B are rough sketches of the electrodes in an embodiment of the present invention; and FIG. 10 is a view showing the winding-back portion in the neighborhood of the winding core in the spiral electrode of the battery according to the present invention.

BEST MODE FOR CARRYING OUT THE INVENTION

An explanation will be given of the present invention in connection with preferable embodiments.

Embodiment 1

Figure 1:
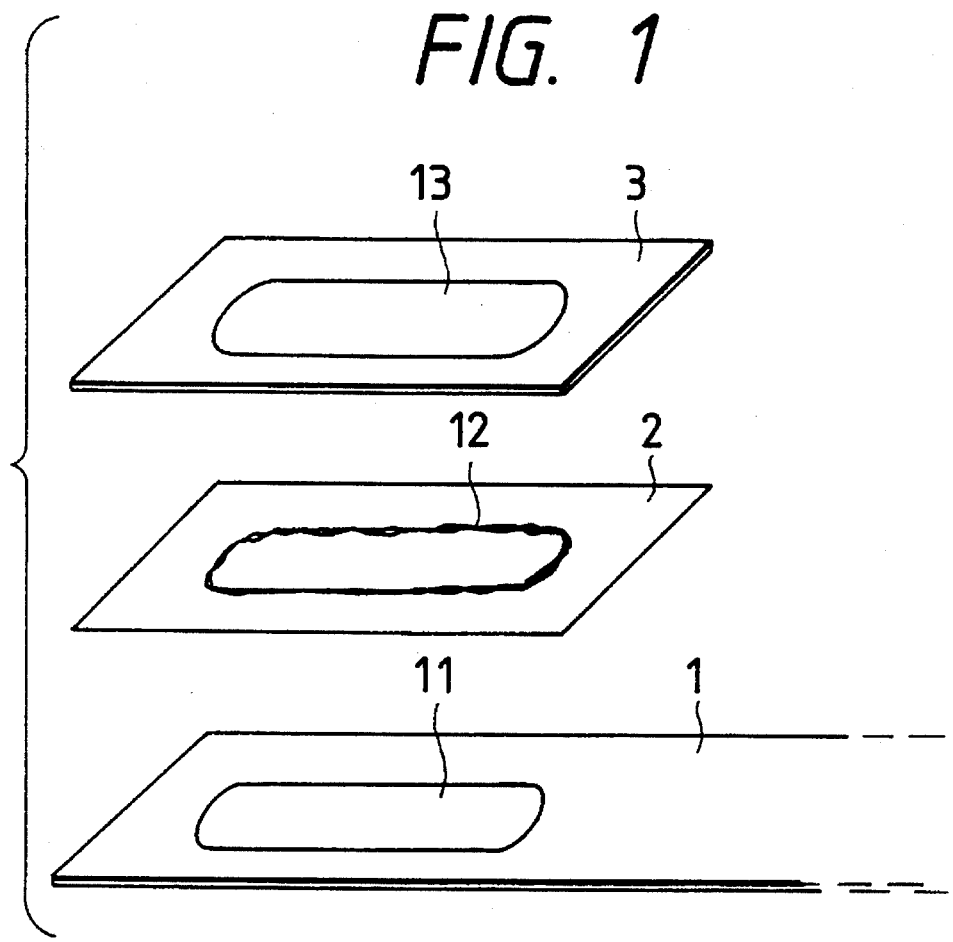
FIG. 1 is a view showing the components of the safety valve according to an embodiment of the present invention.
Figure 2:
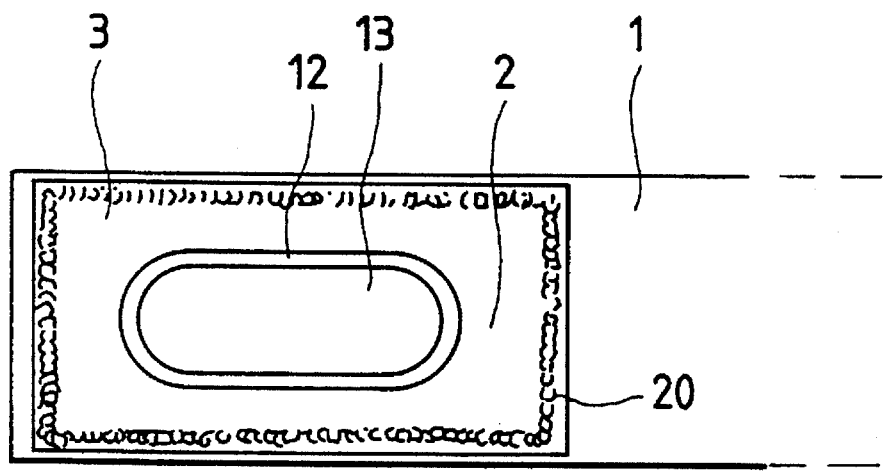
FIG. 2 is a view showing the safety valve portion in the embodiment of the present invention viewed from above.

FIG. 1 is a view showing the components of the safety valve in an embodiment of the present invention. FIG. 2 is a view of the safety valve portion viewed from above.

A cover plate 1 is a plate of SUS 304 having a thickness of 0.4 mm and includes a gas discharging hole 11. The plane shape used in an angular battery is square. In the figure, only the neighborhood which serves as a valve structure portion of the cover plate is shown. A holding plate 3 is a plate of SUS 304 having a thickness of 0.1 mm and includes an oval-shaped through-hole 13. The shapes of the gas discharging hole 11 and through-hole 13, which are not limited to a particular shape, are oval-shaped in this embodiment.

A metal thin plate 2 is made of rolled Ni-annealed material having a thickness of 30 µm. A groove 12 is formed by etching at the position which faces with gas discharging holes 11 and 13 after assembling. At the groove, the metal thin plate has a thickness of 5 µm, and the portion surrounded by the groove has an oval shape which is geometrically similar to and slightly smaller than that of the gas discharging holes.

Incidentally, in this embodiment, the metal thin plate having a portion with a thickness reduced by etching is used, but a metal thin plate with a uniform thickness also can be used. The thickness of the metal thin plate and presence or absence and shape of the thin portion formed by etching may be determined in relation with a safety valve operating pressure.

The annealing material is used to remove distortion of the thin plate by rolling (if there is distortion, its heat-shrinkage may adversely affect sealing property).

The metal thin plate is arranged on the gas discharging hole of the cover plate, and further a holding plate is arranged thereon thus making a lamination state sandwiching the metal thin plate. The holding plate is resistance-welded at four corner points and tentatively fastened. Next, the inner periphery 20 of the holding plate is laser welded to integrate the laminate of the cover plate, metal thin plate and holding plate. Thus, the cover body having a safety valve is completed. The cover body thus formed is welded to an angular battery vessel incorporating generating components to seal the vessel.

Incidentally, although not attached in this embodiment, a protection cover of metal or resin can be attached to the cover plate so that unnecessary force is not given to the safety valve from outside. In this case, if the protection cover is brought into intimate contact with the cover plate, the safety valve will be stopped up. This adversely affects gas discharge when the safety valve is operated. Therefore, the shape of the protection cover or its attachment position must be determined so that gas discharge can be done effectively. A battery A according to the present invention was fabricated in the above manner.

Embodiment 2

Figure 3:
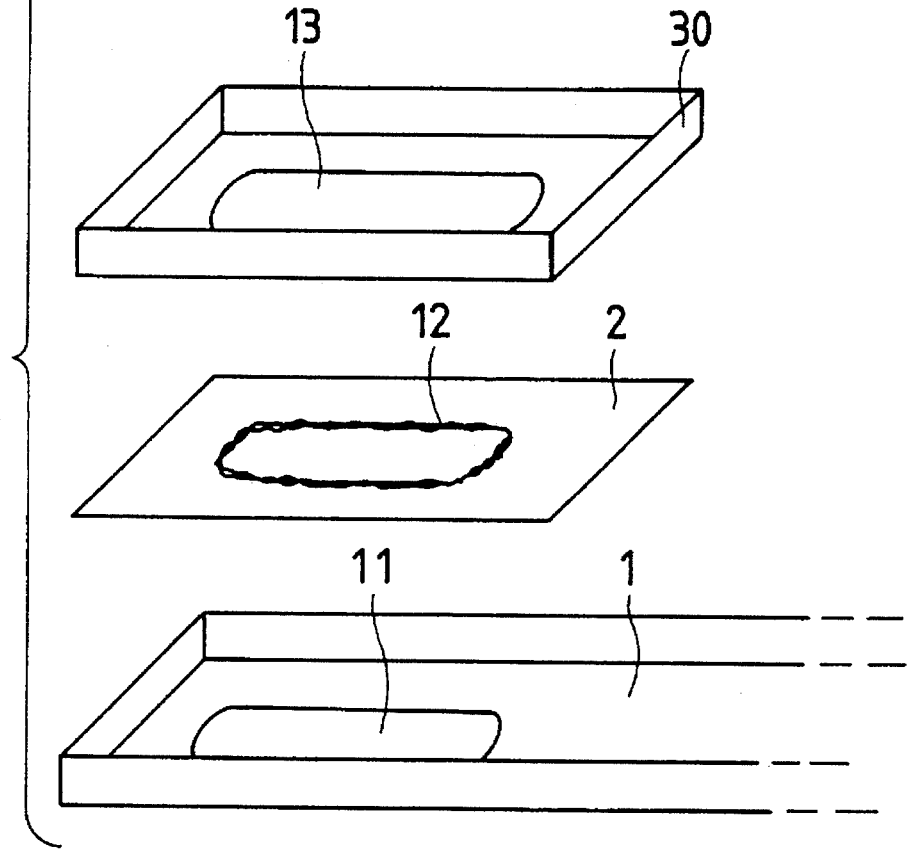
FIG. 3 is a view showing the components of the safety valve in another embodiment of the present invention.

FIG. 3 shows the components of a safety valve according to another embodiment. The safety valve is composed of a cover plate having a substantially U-shaped section with a wall surface in its periphery and a holding plate 30 having a substantially U-shaped section with a wall shape section. The holding plate is internally touched to the cover plate so that the wall surface of the holding plate abuts on that of the cover plate. Such a structure is adopted to make it easy to position the holding plate and to prevent it from slipping off in a fixing operation.

A battery B according to the present invention was fabricated in the same manner as in the battery A except the above structure.

Embodiment 3

Figure 4:
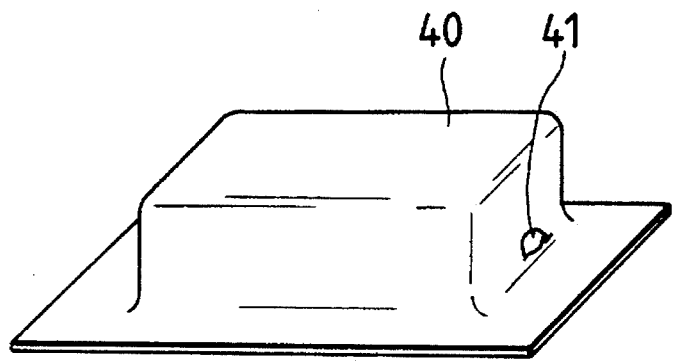
FIG. 4 is a view showing the holding plate having a cover portion used in another embodiment of the present invention.

In order to prevent the metal thin plate from being damaged owing to application of force from outside, a battery C according to the present invention was fabricated in the same manner as in the battery A except that a holding plate 40 having a cap-shaped portion covering the gas discharging hole portion is used as shown in FIG. 4. In this embodiment, a hole 41 for evacuation is formed at a position in the cap-shaped portion so that gas can be discharged externally from the cap-shaped the holding plate when the valve operates.

Comparative Example 1

For comparison, a battery D was fabricated in the following manner. A laminate is fabricated which is composed of a metal thin plate and a holed metal plate bonded to each other by thermal crimping. The metal thin plate and holed metal plate are the same as those used in the battery A. The thermal crimping was carried out in such a manner that these two plates are stacked and heated at about 1000° C. under pressure in a vacuum furnace. This stack is welded to the cover plate having a hole to form the cover body which is integrated to an angular battery vessel as done for battery A.

Comparative Example 2

A battery E was fabricated in the same manner as battery A except that the metal thin plate is directly laser-welded to the cover plate.

Evaluation

Table 1 shows the faulty rates for 100 pieces of each of the batteries A, B and C according to the embodiments and the batteries D and E of the comparative examples. The presence of leakage liquid was examined after 100 of each of these batteries are left at a high temperature of 85° C. The results are shown in Table 2.

TABLE 1

| Faulty Production Rate in Fabrication (%) | |
|---|---|
| Battery A | 0 |
| Battery B | 0 |
| Battery C | 0 |
| Battery D | 13 |
| Battery E | 5 |

TABLE 2

Number of batteries with leakage liquid when left at high temperatures (in 100 pieces for each battery)

| | 30th day | 60th day |
|---|---|---|
| Battery A | 0 | 0 |
| Battery B | 0 | 0 |
| Battery C | 0 | 0 |
| Battery D | 13 | 24 |
| Battery E | 5 | 6 |

A Shock Test in which 40 pieces for each battery were dropped on plastic from a height of 3 meters was also carried out. In the comparative battery D, the thermal-crimped portion of the laminate of the safety valve came off for 3 pieces. In the comparative battery, the laminate portion did not come off but the electrolytic solution leaked for 2 pieces. On the other hand, in the batteries A, B and C according to the embodiments, the laminate portion did not come off and also the leakage of the electrolytic solution did not occur.

Embodiment 4

Figure 6A:
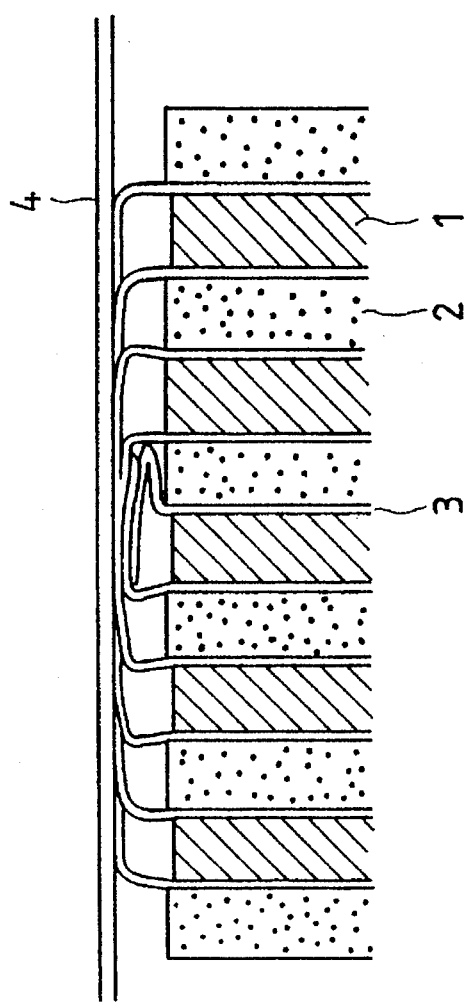
FIGS. 6A and 6B are a sectional views of a battery according to the present invention.
Figure 6B:
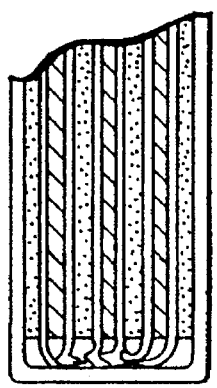
Figure 5:
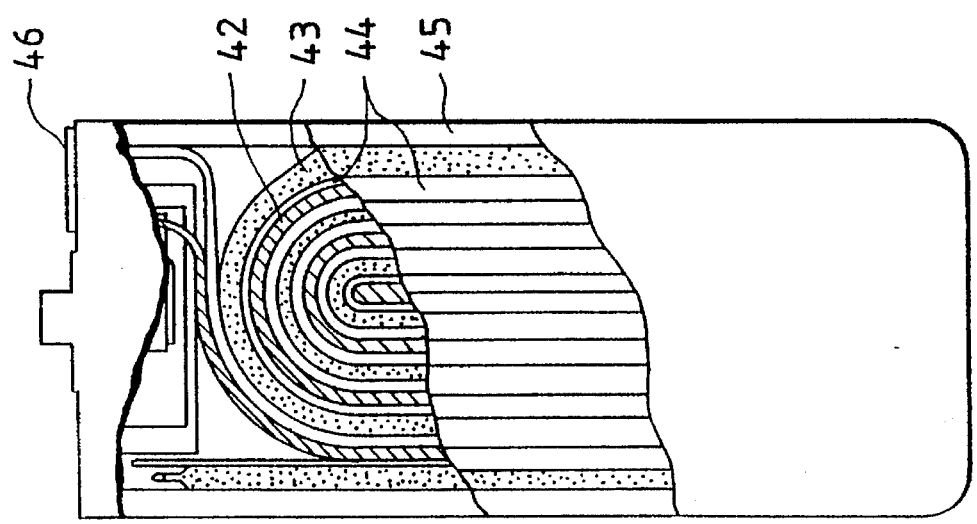
FIG. 5 is a view showing a battery according to an embodiment of the present invention.
Figure 7:
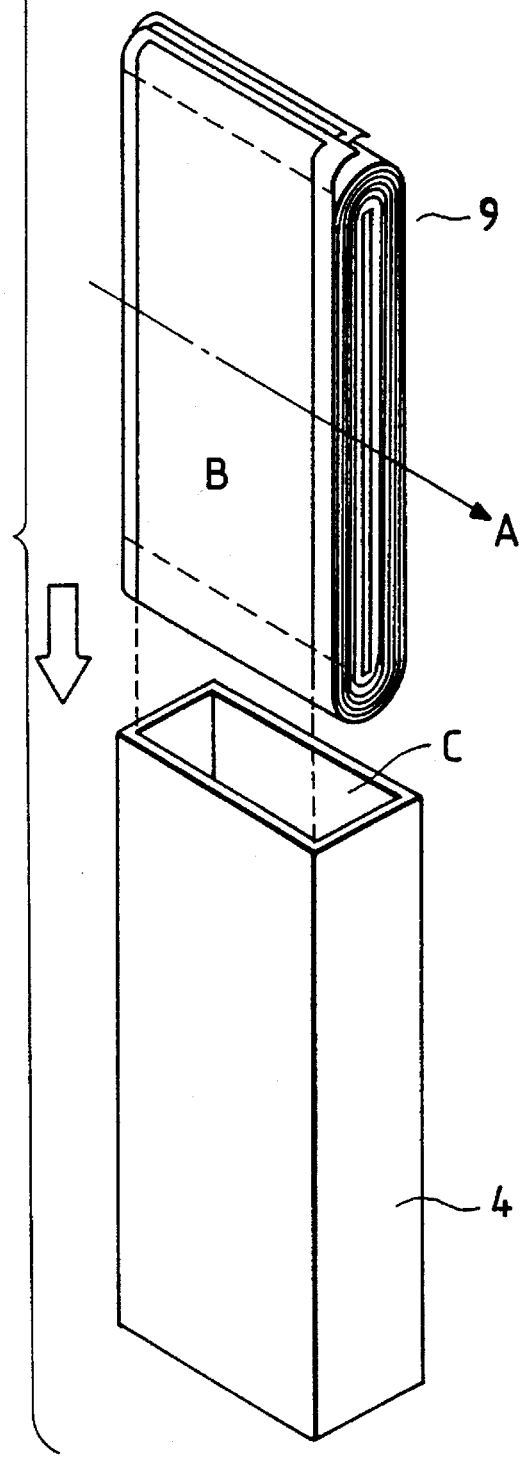
FIG. 7 is a view showing the insertion direction of spiral electrode plates and a battery case according to an embodiment of the present invention.

FIG. 5 is a view showing the battery completed in accordance with this embodiment. FIG. 6A is a sectional view when the battery is viewed from the side of the cover. This embodiment was applied to an angular tubular lithium ion secondary battery. FIG. 5 shows a group of spiral electrode plates in which positive electrode plates 42 and negative electrode plates 43 are wound in an elliptical spiral shape around a winding axis having a width 33 mm and thickness of 0.4 mm through a separator of polypropylene fine-porous film having a width of 33 mm and thickness of 25 μm. As shown in FIG. 7 group of spiral electrode plates are inserted into a battery case having an internal dimension of 5.7 mm×21.5 mm×45.5 mm from a direction in which the center line A of the winding axis is in parallel to the opening face C of an angular tubular battery case 45 of Ni plated steel having a thickness of 0.3 mm, and the flat portion B of the spiral electrode group and the opening face C of the battery case 45 are located at right angles. Incidentally, the positive electrode plate 42 is made of the material which is fabricated by applying active material paste of mainly lithium cobalt composite oxide ($Li_xCoO_2$) on both sides of an aluminum foil having a thickness of 20 μm and cutting it in a width of 19 mm after drying and rolling. The negative electrode plate 43 is made of the material which is fabricated by applying paste containing mainly graphite on both sides of a copper foil having a thickness of 18 μm and cutting it in a width of 20 mm after drying and rolling. 100 pieces of the battery according to this embodiment were fabricated.

Figure 8:
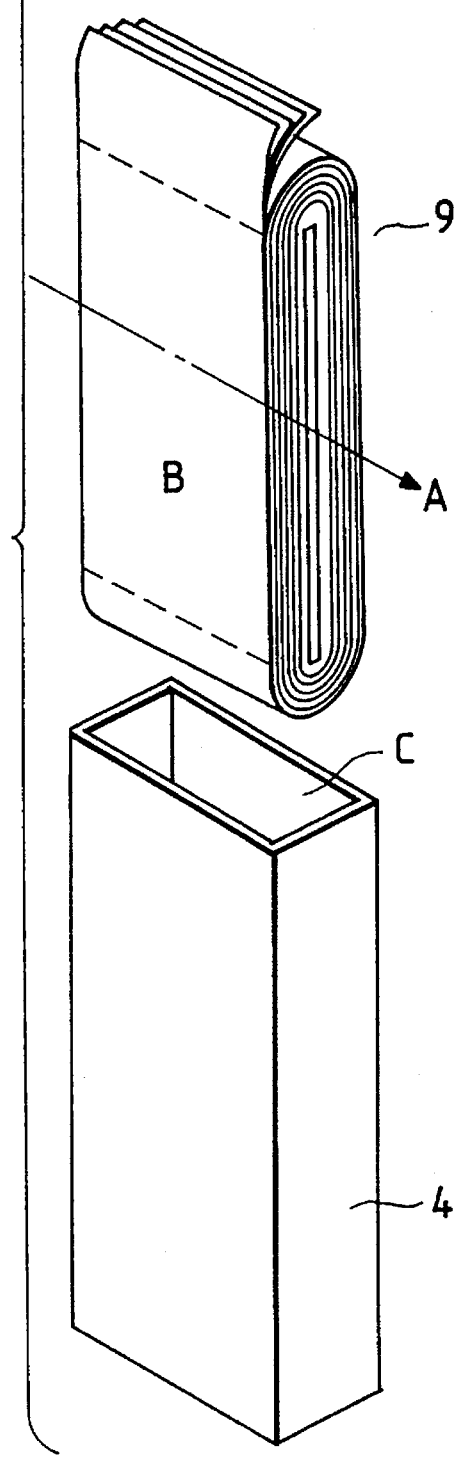
FIG. 8 is a view showing the insertion direction of spiral electrode plates and a battery case in a comparative example.

As a comparative example according to the conventional art, 100 pieces of the battery were fabricated in which a group of electrode plates are inserted into a case. The group of electrode plates are formed by winding the same positive electrode plates 42 and negative plates 43 as in this embodiment of the present invention shown in FIG. 8 in an elliptical spiral shape through a separator having the same material and thickness as in the embodiment and a width of 21.5 mm.

For 100 pieces of each of the batteries in the embodiment and comparative examples, an oscillation having a frequency of 10–500 Hz, amplitude of 1.5 mm and 0.3–10 G was applied for 60 minutes in all directions to measure the closed circuit before and after the application of the oscillations. On the basis of the voltage drop, the internal shortcircuiting was examined. The results are shown in Table 3.

TABLE 3

| Battery | Internal short-circuiting production rate |
| --- | --- |
| Embodiments | 0/100 |
| Comparative examples | 6/100 |

It can be seen that the battery in the comparative examples in which the width of the separator in the direction of winding axis is larger than the width of the positive and negative electrode plates and the longer side of the case has a high faulty rate owing to internal short-circuiting. As a result of examination, it can be seen that in the batteries with the internal short-circuiting, the inside of the negative electrode case is brought into contact with the end of the positive electrode plate which is attributable to slip in the electrode plates by vibration.

On the other hand, the batteries according to the embodiments, in which the width of the separator in the direction of the winding shaft is larger than the side of the opening of the angular tubular case which is in parallel to the direction of the winding axis, are bent and fixed in a case. Thus, occurrence of the slip due to the vibration of the positive electrode does not lead to internal short-circuiting. Therefore, it can be seen that the battery has excellent safety. Incidentally, in the embodiments, an angular tubular lithium secondary battery is explained. The present invention is not limited to such a battery. The same effect can be obtained in a battery adopting a group of elliptical spiral electrodes, such as an angular tubular lithium ion battery, an angular tubular Ni-Zn secondary battery and an angular tubular Ni-H secondary battery.

Embodiment 5

The rough sketch of the sealed type battery according to the present invention is shown in FIG. 9. In FIG. 9, the active material layer inside the electrode winding-back portion to the second from the winding core of the positive electrodes 42 is exfoliated by a width of 10 mm. Therefore, as shown in FIG. 10, the electrode winding-back portion does not include the positive active material which is a lithium source so that deposition of lithium on the negative electrode surface is principally prevented.

In this embodiment, although the positive electrode active material in the winding-back portion was completely peeled off, the positive electrode at the winding-back portion has only to be cut away to a degree which prevents deposition.

Industrial Applicability

The present invention can provide a safety valve device which can operate with good reproducibility and at high accuracy under low pressure when the internal pressure of a battery vessel increases and can provide excellent sealing, thus enhancing the safety of the sealed type battery.

The present invention can prevent occurrence of short-circuiting in the battery due to vibration and shock and prevent the internal short-circuiting due to lithium dendrite at the electrode winding-back portion, thus enhancing the safety of the battery.

We claim:

1. A sealed battery including a safety valve device in which metal plates in a laminate are integrally fixed by laser welding, said laminate being comprised of a cover plate having a hole, a metal thin plate, and a holding plate having a hole defined by a perimeter, characterized in that the hole of the holding plate extends throughout an entire area between the perimeter, and the metal thin plate is arranged between the cover plate and the holding plate so as to contact a bottom surface of the cover plate and a top surface of the holding plate and interrupt a gas discharging hole formed by the holes of the metal thin plate and cover plate.

2. A sealed battery according to claim 1, characterized in that the portion of the metal thin plate facing the gas discharging hole has a thinner portion having a thickness that is smaller than a thickness of the remaining portion of the metal thin plate.

3. A sealed battery according to claim 1 characterized in that the holding plate and the cover plate each have a wall extending away from the holding plate and the cover plate in a direction that is substantially perpendicular to the holding plate and the cover plate, such that the wall of the holding plate abuts the wall of the cover plate.

4. A sealed battery according to claim 1, characterized in that the holding plate has a cap-shaped covering portion which covers the gas discharging hole.

5. A sealed battery according to claim 1 in which a group of spiral electrodes comprised of band-like positive electrodes and negative electrodes wound in an elliptical spiral shape around a winding axis and through a separator are inserted from a square or an elliptical opening face of a tubular case in such a manner that the winding axis of the group of spiral electrodes is in parallel to the opening face of the case and thereafter the opening face is hermetically sealed; characterized in that the width of the separator in the direction of the winding axis is larger than the internal width of the tubular case in the direction of the winding axis.

6. A sealed battery according to claim 1, in which a group of spiral electrodes comprised of band-like positive electrodes and negative electrodes wound in an elliptical spiral shape around a winding axis and through a separator to thereby form a winding-back portion and a linear portion are inserted from a square or elliptical opening face of a tubular case, and the positive electrodes are made of lithium composite oxide and the negative electrodes are made of lithium intercalation compound; characterized in that, in one of an inside of the winding-back portion of the group of spiral electrodes and an inside of the winding-back portion to the maximum fifth from the winding core, the capacity of active material per a unit area of the positive electrode area is less than that of the positive electrode of the linear portion of the spiral electrode.

7. A sealed battery according to claim 2 characterized in that the holding plate and the cover plate each have a wall extending away from the holding plate and the cover plate, respectively, in a direction that is substantially perpendicular to the holding plate and the cover plate, such that the wall of the holding plate abuts the wall of the cover plate.

8. A sealed battery according to claim 2, characterized in that the holding plate has a cap-shaped covering portion which covers the gas discharging hole.

9. A sealed battery according to claim 3, characterized in that the holding plate has a cap-shaped covering portion which covers the gas discharging hole.

10. A sealed battery according to claim 7, characterized in that the holding plate has a cap-shaped covering portion which covers the gas discharging hole.

11. A sealed battery according to claim 2 in which a group of spiral electrodes comprised of band-like positive electrodes and negative electrodes wound in an elliptical spiral shape around a winding axis and through a separator are inserted from a square or an elliptical opening face of a tubular case in such a manner that the winding axis of the group of spiral electrodes is in parallel to the opening face of the case and thereafter the opening face is hermetically sealed; characterized in that the width of the separator in the direction of the winding axis is larger than the internal width of the tubular case in the direction of the winding axis.

12. A sealed battery according to claim 3 in which a group of spiral electrodes comprised of band-like positive electrodes and negative electrodes wound in an elliptical spiral shape around a winding axis and through a separator are inserted from a square or an elliptical opening face of a tubular case in such a manner that the winding axis of the group of spiral electrodes is in parallel to the opening face of the case and thereafter the opening face is hermetically sealed; characterized in that the width of the separator in the direction of the winding axis is larger than the internal width of the tubular case in the direction of the winding axis.

13. A sealed battery according to claim 7 in which a group of spiral electrodes comprised of band-like positive electrodes and negative electrodes wound in an elliptical spiral shape around a winding axis and through a separator are inserted from a square or an elliptical opening face of a tubular case in such a manner that the winding axis of the group of spiral electrodes is in parallel to the opening face of the case and thereafter the opening face is hermetically sealed; characterized in that the width of the separator in the direction of the winding axis is larger than the internal width of the tubular case in the direction of the winding axis.

14. A sealed battery according to claim 4 in which a group of spiral electrodes comprised of band-like positive electrodes and negative electrodes wound in an elliptical spiral shape around a winding axis and through a separator are inserted from a square or an elliptical opening face of a tubular case in such a manner that the winding axis of the group of spiral electrodes is in parallel to the opening face of the case and thereafter the opening face is hermetically sealed; characterized in that the width of the separator in the direction of the winding axis is larger than the internal width of the tubular case in the direction of the winding axis.

15. A sealed battery according to claim 8 in which a group of spiral electrodes comprised of band-like positive electrodes and negative electrodes wound in an elliptical spiral shape around a winding axis and through a separator are inserted from a square or an elliptical opening face of a tubular case in such a manner that the winding axis of the group of spiral electrodes is in parallel to the opening face of the case and thereafter the opening face is hermetically sealed; characterized in that the width of the separator in the direction of the winding axis is larger than the internal width of the tubular case in the direction of the winding axis.

16. A sealed battery according to claim 9 in which a group of spiral electrodes comprised of band-like positive electrodes and negative electrodes wound in an elliptical spiral shape around a winding axis and through a separator are inserted from a square or an elliptical opening face of a tubular case in such a manner that the winding axis of the group of spiral electrodes is in parallel to the opening face of the case and thereafter the opening face is hermetically sealed; characterized in that the width of the separator in the direction of the winding axis is larger than the internal width of the tubular case in the direction of the winding axis.

17. A sealed battery according to claim 10 in which a group of spiral electrodes comprised of band-like positive electrodes and negative electrodes wound in an elliptical spiral shape around a winding axis and through a separator are inserted from a square or an elliptical opening face of a tubular case in such a manner that the winding axis of the group of spiral electrodes is in parallel to the opening face of the case and thereafter the opening face is hermetically sealed; characterized in that the width of the separator in the direction of the winding axis is larger than the internal width of the tubular case in the direction of the winding axis.

18. A sealed battery according to claim 1, 2, 3, 4, 7, 8, 9 or 10, in which a group of spiral electrodes comprised of band-like positive electrodes and negative electrodes wound in an elliptical spiral shape around a winding axis and through a separator to thereby form a winding-back portion and a linear portion are inserted from a square or elliptical opening face of a tubular case, and the positive electrodes are made of lithium composite oxide and the negative electrodes are made of lithium intercalation compound; characterized in that, in are of an inside of the winding-back portion of the group of spiral electrodes and an inside of the winding-back portion to the maximum fifth from the winding core, the capacity of active material per a unit area of the positive electrode area is less than that of the positive electrode of the linear portion of the spiral electrode.

19. A sealed battery according to claim 11, 12, 13, 14, 15, 16 or 17, wherein the positive electrodes are made of lithium composite oxide and the negative electrodes are made of lithium intercalation compound; characterized in that, in are of an inside of the winding-back portion of the group of spiral electrodes and an inside of the winding-back portion to the maximum fifth from the winding core, the capacity of active material per a unit area of the positive electrode area is less than that of the positive electrode of the linear portion of the spiral electrode.

* * * * *